United States Patent Office 2,836,599
Patented May 27, 1958

2,836,599

N-(CARBOXYALKYL) DINITRO LACTAMS

Milton B. Frankel, Pasadena, and Karl Klager, Monrovia, Calif., assignors to Aerojet-General Corporation, Azusa, Calif., a corporation of Ohio No Drawing. Application March 7, 1957
Serial No. 644,693

19 Claims. (Cl. 260—294)

This invention relates to new compositions of matter and a method for their preparation. In particular, this invention relates to cyclic amides having the general formula:

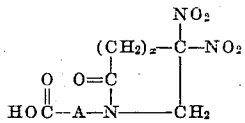

wherein A is an alkylene radical and $x$ is a whole number from 1 to 2 inclusive.

This application is a continuation-in-part of our co-pending United States patent application Serial No. 416,698, filed March 16, 1954, now abandoned.

Due to their high oxygen content, the cyclic amides of this invention find valuable use as explosives.

The compounds of this invention are prepared by condensing an amino acid with a nitro-substituted ester alcohol, in accordance with the general reaction scheme set forth below:

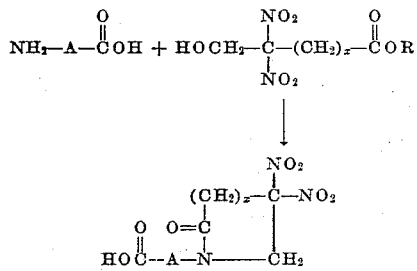

wherein A is an alkylene radical, $x$ is a small whole number from 1 to 2 inclusive, and R is a lower alkyl radical.

Optimum results are obtained when the reaction is conducted at a pH in the range of from about 7 to about 10 inclusive.

The hydroxy dinitro esters used as starting materials for this invention are prepared by condensing a nitronate salt of ω-geminal dinitro ester with formaldehyde in accordance with the procedure described in the J. Org. Chem., vol. 16, p. 161, 1951.

To more clearly illustrate this invention, the following example is presented. It is to be understood, however, that this example is presented merely as a means of illustration, and is not intended to limit the scope of the invention in any way.

EXAMPLE I

*Preparation of 5,5-dinitro-2-piperidone-N-acetic acid*

In an Erlenmeyer flask a solution of 7.5 gm. glycine, 4 gm. sodium hydroxide and 50 ml. water was mixed with 22.2 gm. methyl 5-hydroxy-4,4-dinitrovalerate. A yellow solution was formed and the temperature rose up to 38° C. The mixture was allowed to stand overnight. Acidification with dilute sulfuric acid caused an oily precipitation, which soon crystallized. The crystals were collected on a Büchner funnel, thoroughly washed with water and dried in a desiccator to yield 15.2 gm. Recrystallization from methanol and water and from ether gave colorless crystals, M. P. 128–130° C.

We have also found that β-amino propionic, α-aminobutyric and δ-aminovaleric acid condense with the esters of 4-hydroxy-3,3-dinitrobutanoic acid as well as the esters of 5-hydroxy-4,4-dinitrovaleric acid to produce cyclic amides such as: β-(4,4-dinitro-2-pyrrolidone-N-)-propionic acid, α-(4,4-dinitro-2-pyrrolidone-N-)-butyric acid, δ-(4,4-dinitro-2-pyrrolidone-N-)-valeric acid, β-5,5-dinitro-2-piperidone-N-)-propionic acid, α-(5,5-dinitro-2-piperidone-N-)-butyric acid, and δ-(5,5-dinitro-2-piperidone-N-)-valeric acid.

From this it becomes apparent that any cyclic amide of this series can be prepared by merely reacting an appropriate hydroxy-dinitro ester having a 4 or 5 membered carbon chain with an amino acid, in accordance with the teachings of this invention.

The new nitro-substituted cyclic amides of our invention are useful as high explosives and can be used in any conventional explosive missile, projectile, rocket, or the like, as the main explosive charge. An example of such a missile is disclosed in United States Patent No. 2,470,162, issued May 17, 1949. One way of using the high explosives of this invention in a device such as that disclosed in United States Patent No. 2,470,162, is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact- or time fuse-mechanism firing a detonating explosive such as lead azide or mercury fulminate.

We claim:

1. As new compositions of matter, the cyclic amides having the general formula:

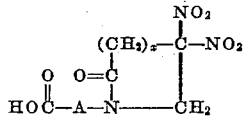

wherein A is a lower alkylene radical and $x$ is a whole number from 1 to 2 inclusive.

2. As new compositions of matter, the cyclic amides having the general formula:

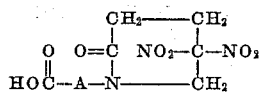

wherein A is a lower alkylene radical.

3. As a new composition of matter, 5,5-dinitro-2-piperidone-N-acetic acid having the structural formula:

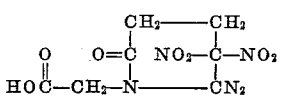

4. As a new composition of matter, β-(-4,4-dinitro-2-pyrrolidone-N-)-propionic acid having the structural formula:

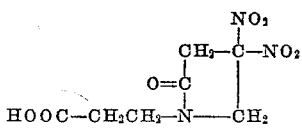

5. As a new composition of matter, α-(-4,4-dinitro-2- pyrrolidone-N-)-butyric acid having the structural formula:

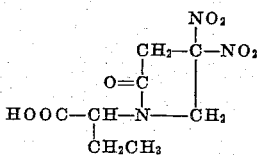

6. As a new composition of matter, δ-(-4,4-dinitro-2-pyrrolidone-N-)-valeric acid having the structural formula:

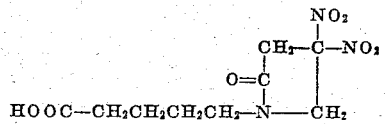

7. As a new composition of matter, β-(-5,5-dinitro-2-piperidone-N-)-propionic acid having the structural formula:

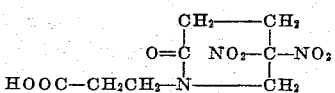

8. As a new composition of matter, α-(-5,5-dinitro-2-piperidone-N-)-butyric acid having the structural formula:

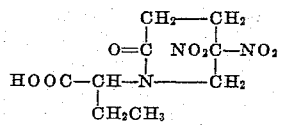

9. As a new composition of matter, δ-(-5,5-dinitro-2-piperidone-N-)-valeric acid having the structural formula:

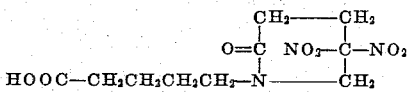

10. The method of preparing cyclic amides having the general formula:

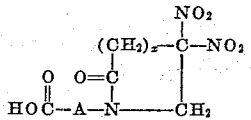

which comprises condensing an amino acid having the general formula:

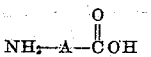

with an ester having the general formula:

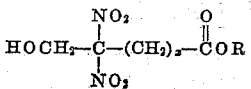

wherein R is a lower alkyl radical, $x$ is a whole number from 1 to 2 inclusive, and A is a lower alkylene radical.

11. The method of claim 10 wherein the condensation is effected at a pH of from about 7 to about 10.

12. The method of preparing cyclic amides having the general formula:

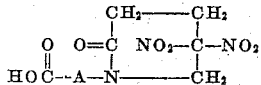

which comprises condensing a lower alkyl ester of 5-hydroxy-4,4-dinitrovaleric acid with an amino acid having the general formula:

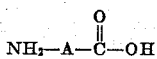

wherein A is a lower alkylene radical.

13. The method of preparing 4,4-dinitro-2-piperidone-N-acetic acid which comprises condensing glycine with a lower alkyl ester of 5-hydroxy-4,4-dinitrovaleric acid.

14. The method of preparing β-(-4,4-dinitro-2-pyrrolidone-N-)-propionic acid which comprises reacting β-aminopropionic acid with a lower alkyl ester of 4-hydroxy-3,3-dinitrobutanoic acid.

15. The method of preparing α-(-4,4-dinitro-2-pyrrolidone-N-)-butyric acid which comprises reacting α-aminobutyric acid with a lower alkyl ester of 4-hydroxy-3,3-dinitrobutanoic acid.

16. The method of preparing δ-(-4,4-dinitro-2-pyrrolidone-N-)-valeric acid which comprises reacting δ-aminovaleric acid with a lower alkyl ester of 4-hydroxy-3,3-dinitrobutanoic acid.

17. The method of preparing β-(-5,5-dinitro-2-piperidone-N-)-propionic acid which comprises reacting β-aminopropionic acid with a lower alkyl ester of 5-hydroxy-4,4-dinitrovaleric acid.

18. The method of perparing α-(-5,5-dinitro-2-piperidone-N-)-butyric acid which comprises reacting α-aminobutyric acid with a lower alkyl ester of 5-hydroxy-4,4-dinitrovaleric acid.

19. The method of preparing δ-(-5,5-dinitro-2-piperidone-N-)-valeric acid which comprises reacting δ-aminovaleric acid with a lower alkyl ester of 5-hydroxy-4,4-dinitrovaleric acid.

References Cited in the file of this patent

FOREIGN PATENTS 1,042,840    France _____ June 10, 1953

OTHER REFERENCES

Jour. Am. Chem. Soc., vol. 58, pp. 2487–2490 (1936).
Jour. Am. Chem. Soc., vol. 63, pp. 1281–1283 (1941).

UNITED STATES PATENT OFFICE
CERTIFICATE OF CORRECTION

Patent No. 2,836,599                                      May 27, 1958

Milton B. Frankel et al.

It is hereby certified that error appears in the printed specification of the above numbered patent requiring correction and that the said Letters Patent should read as corrected below.

Column 1, line 55, after "salt of" insert -- an --; column 2, line 12, for "-5,5-di-" read -- -(5,5-di- --; line 63, claim 3, the last line of the formula, for "HOC-CH$_2$-N——CN$_2$" read -- HOC-CH$_2$-N——CH$_2$ --.

Signed and sealed this 3rd day of February 1959.

(SEAL)

Attest:

KARL H. AXLINE                                     ROBERT C. WATSON

Attesting Officer                                    Commissioner of Patents